Dec. 4, 1962 D'ORR PACKER 3,066,799
EGG CLEANING, CANDLING AND SORTING MACHINE WITH
FLEXIBLE TURNTABLE
Filed Sept. 12, 1961 4 Sheets-Sheet 1
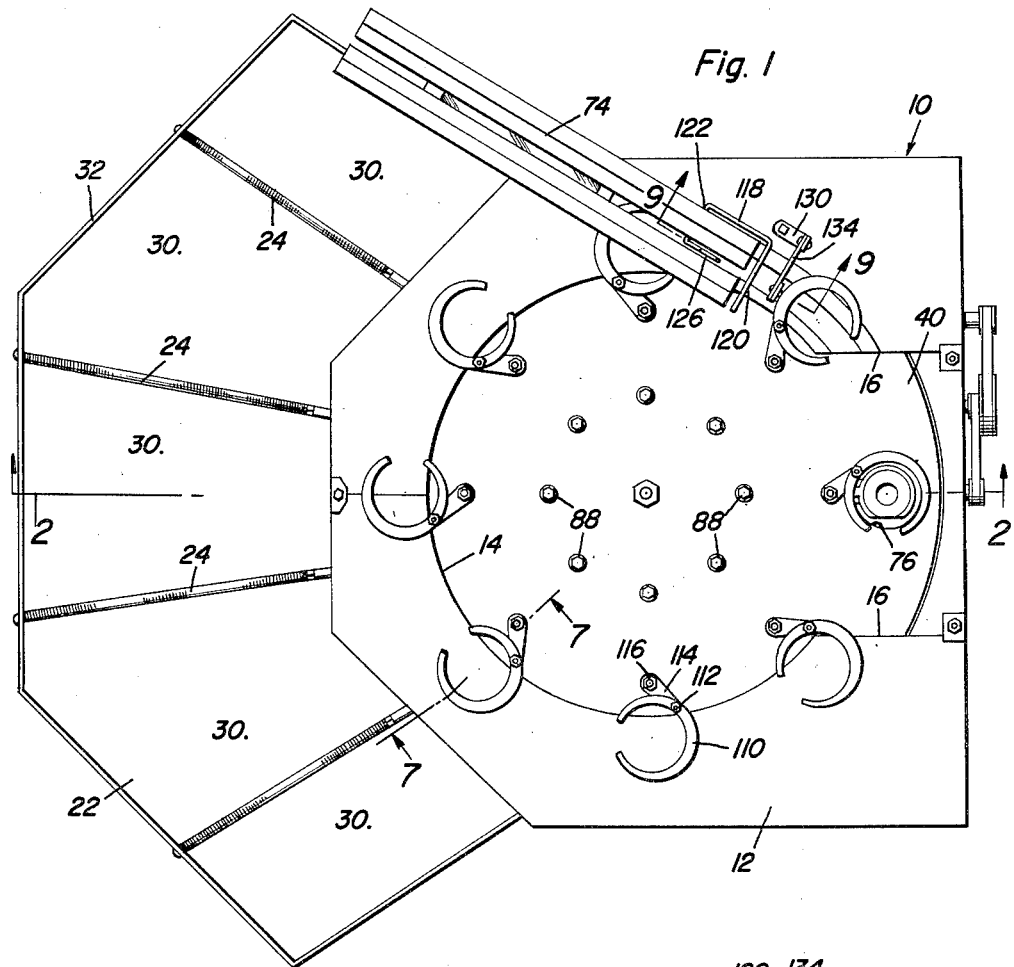
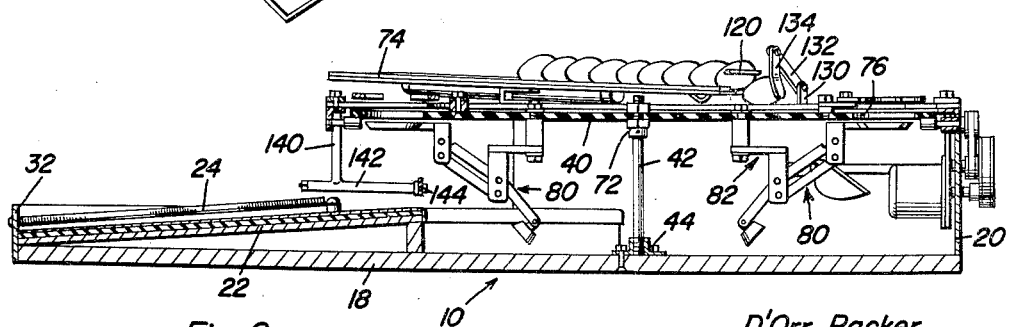
D'Orr Packer
INVENTOR.

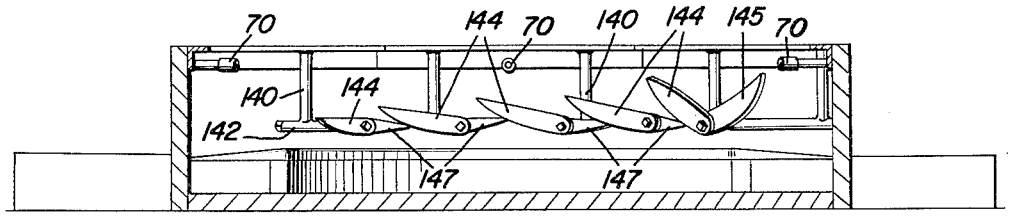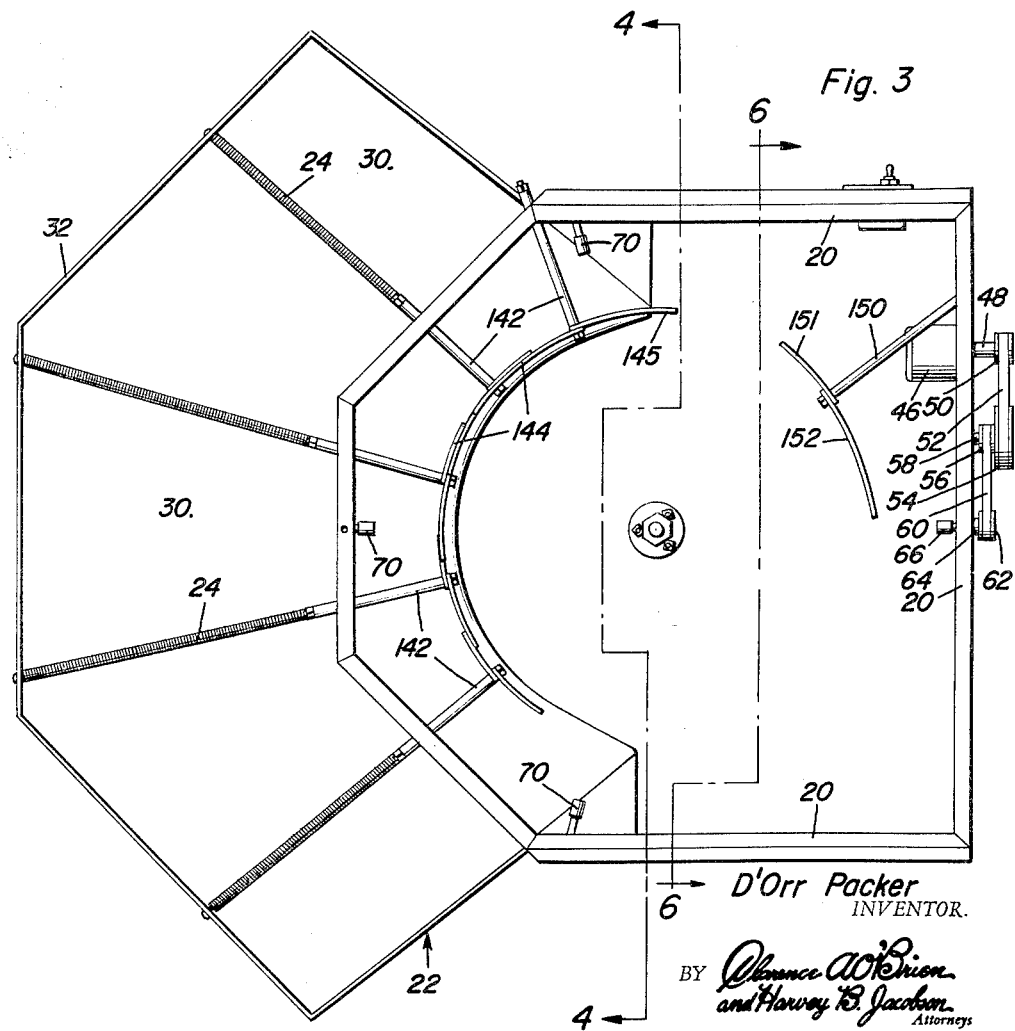

Dec. 4, 1962  D'ORR PACKER  3,066,799
EGG CLEANING, CANDLING AND SORTING MACHINE WITH
FLEXIBLE TURNTABLE
Filed Sept. 12, 1961  4 Sheets-Sheet 3
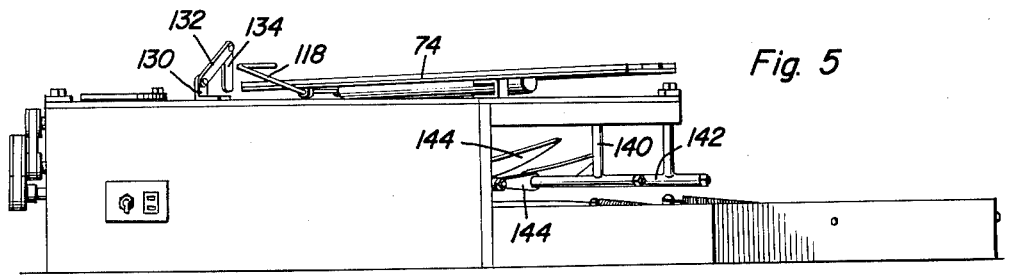
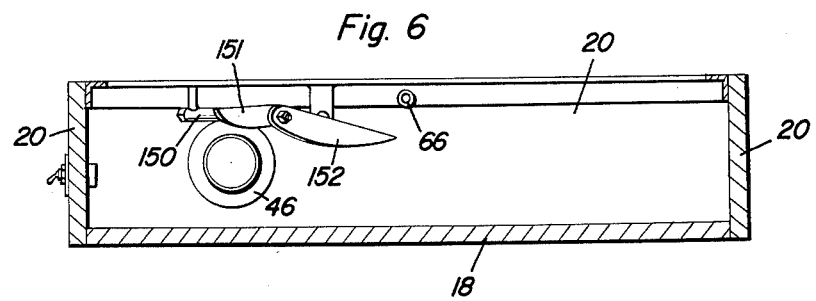
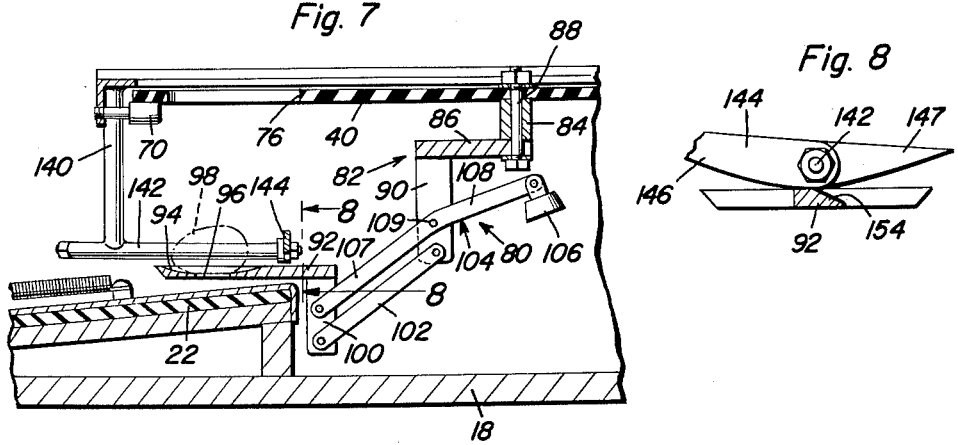
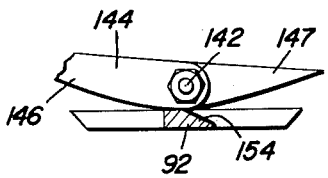
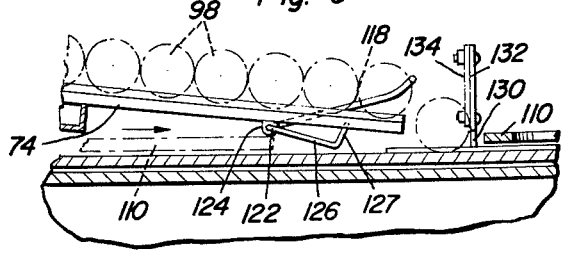
D'Orr Packer
INVENTOR.

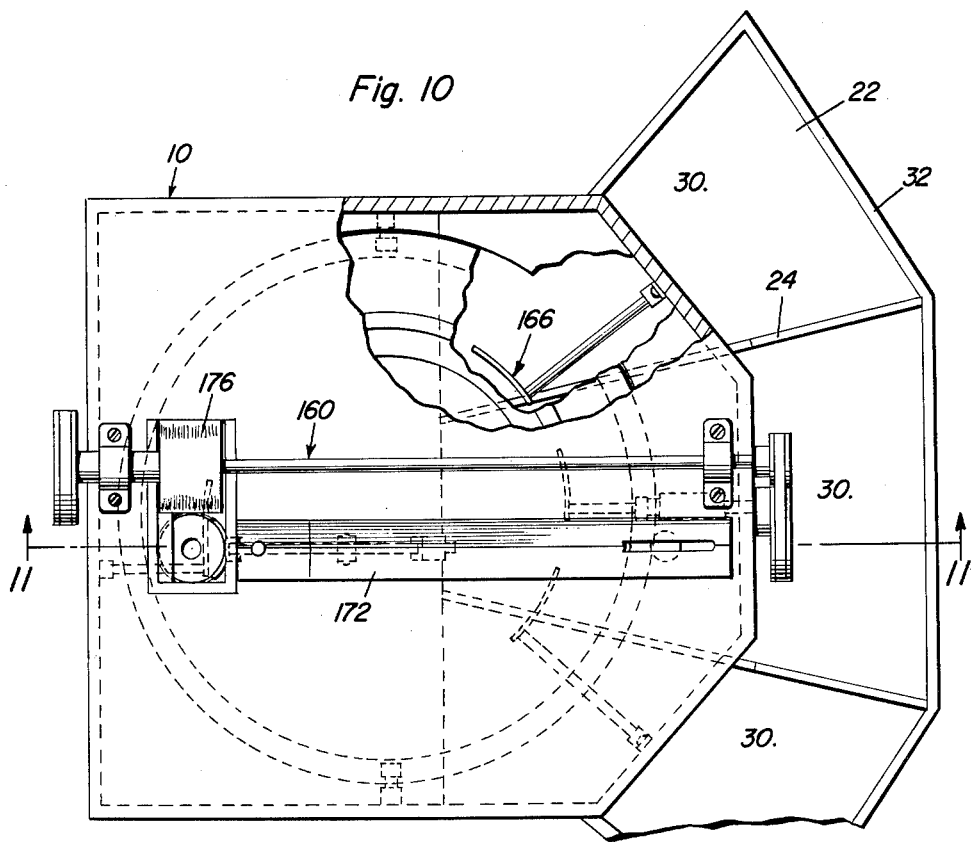
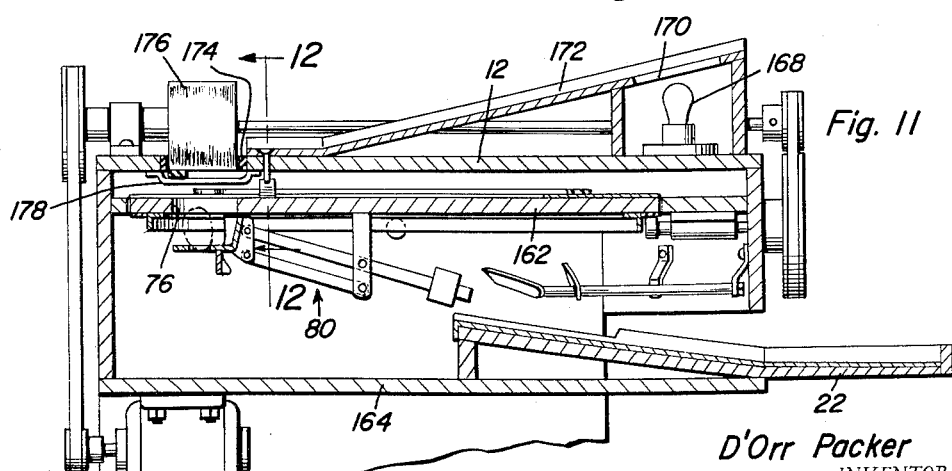
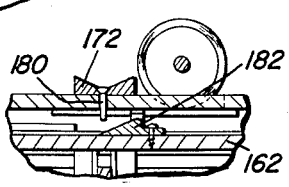

United States Patent Office 3,066,799
Patented Dec. 4, 1962

3,066,799
EGG CLEANING, CANDLING AND SORTING MACHINE WITH FLEXIBLE TURNTABLE
D'Orr Packer, 926 S. Johns Ave., Emmett, Idaho
Filed Sept. 12, 1961, Ser. No. 137,589
21 Claims. (Cl. 209—121)

This invention comprises a novel and useful egg cleaning, candling and sorting machine with flexible turntable and constitutes a continuation-in-part of my prior copending application Serial No. 760,218, filed September 10, 1958, for Egg Cleaning, Candling and Sorting Machine, now abandoned, and presents improvements over the apparatus disclosed in said application.

This invention comprises a novel and useful egg cleaning, candling and sorting machine and more especially pertains to an egg handling apparatus which will greatly facilitate and perform in an automatic and improved manner the steps of candling eggs, dry cleaning the same, and then weight sorting the cleaned eggs.

The primary purpose of this invention is to provide a compact and efficient apparatus which will enable the poultryman handling a relatively small quantity of eggs to successively candle the eggs, dry clean them without the use of moisture, and then gravity sort and separate the cleaned eggs into a reasonable number of commercial grades in an efficient and improved manner.

A further object of the invention is to provide an apparatus in accordance with the preceding object wherein use of gravity is employed to assist in conveying the eggs between the various stations of the apparatus and their passage through the machine.

A further object of the invention is to provide an apparatus capable of processing an egg in a very short time, as for example about five seconds, for complete passage of the egg through the cycle of treatment by the apparatus.

A further object of the invention is to provide an egg handling apparatus in accordance with the foregoing object having means which will greatly improve and facilitate the dry cleaning of the egg by a buffing wheel; the feeding of one egg to the buffing wheel for cleaning in properly timed relation to the discharge of a cleaned egg therefrom; together with provision for improving the cleaning operation and preventing damage of the egg by passage below the buffing wheel.

A still further important object of the invention is to provide an egg handling apparatus in accordance with the preceding objects wherein a rotary turntable is employed as a means for retaining and supporting the egg during the cleaning operation; in timed relation discharging the cleaned egg from the buffing wheel through the turntable; in timing the discharging of the cleaned egg and the introduction of the succeeding egg to the buffing wheel; for supporting an egg weighing scale below the turntable; and for conveying the weighed egg and automatically discharging the same to a proper discharge tray.

And a further and more specific object of the invention is to provide an apparatus in which means is provided for positively removing the egg from the weighing mechanism mounted upon the conveying turntable after the egg has been weighed and wherein the turntable itself shall be of a flexible material whereby the weight of the turntable and mechanism carried thereby will cause the turntable to flatten itself upon the supporting and rotating rollers.

An additional purpose of the invention is to provide a means for effectively feeding eggs singly from a candling tray to the conveying mechanism for discharge to individual, weighing mechanisms carried by a turntable.

Yet another purpose of the invention is to provide an apparatus as set forth in the preceding objects which shall have an improved weighing mechanism carried by a turntable for weight sorting the eggs and for gently lowering the eggs while carrying them from a receiving station to a discharge station.

Still another purpose of the invention is to provide an apparatus whose capacity for egg sorting may be readily varied as desired by merely replacing one turntable and its assembly of weighing mechanism with another having a different number of weight sorting and egg handling mechanisms.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–9 disclose a preferred embodiment of the apparatus while FIGURES 10–12 disclose a modified construction of the apparatus in accordance with my above identified copending application.

FIGURE 1 is a top plan view of a preferred form of apparatus in accordance with this invention;

FIGURE 2 is a vertical longitudinal sectional view taken substantially upon the plane indicated by the section line 2—2 of FIGURE 1;

FIGURE 3 is a top plan view of the apparatus similar to FIGURE 1 but with the sectional covers and the turntable removed therefrom;

FIGURE 4 is a vertical transverse sectional view taken substantially upon the plane indicated by the broken section line 4—4 of FIGURE 3;

FIGURE 5 is a side elevational view of the apparatus of FIGURE 1;

FIGURE 6 is a further detail view taken in vertical section upon a plane indicated by the section line 6—6 of FIGURE 3;

FIGURE 7 is a detail view somewhat enlarged and of the left hand portion of FIGURE 2, taken substantially upon the plane indicated by the section line 7—7 of FIGURE 1 and showing in particular the means for positively discharging the weighed and sorted eggs from the apparatus;

FIGURE 8 is a detail view taken substantially upon the plane indicated by the section line 8—8 of FIGURE 7;

FIGURE 9 is a further detail view of a portion of the egg feeding mechanism of the apparatus taken substantially upon the plane indicated by the section line 9—9 of FIGURE 1;

FIGURE 10 is a fragmentary top plan view, parts being broken away, of the modified form of the apparatus disclosed in my above identified copending application;

FIGURE 11 is a vertical longitudinal sectional view taken substantially upon the plane indicated by the section line 11—11 of FIGURE 10, and FIGURE 12 is a vertical transverse sectional detail view taken substantially upon the plane indicated by the section line 12—12 of FIGURE 11.

*Preferred Modification of FIGURES 1–9*

Reference is now made first to the preferred embodiment of the invention illustrated in FIGURES 1–9 of the drawings. In this form of the invention there is indicated generally by the numeral 10 a support structure which is in the form of a housing or cabinet and which supports and houses the various elements of the assembly. The support includes a removable top 12 which as suggested in FIGURE 1 may include separate sections and which has a flat surface and serves to support certain elements of the mechanism as well as to provide a partial closure and cover for the top of the housing assembly. This top has a circular opening 14 formed therethrough as shown in FIGURE 1, which circular opening opens to the side of the top through parallel edges 16. The cabinet includes a flat bottom wall 18 and there are provided as shown in FIGURES 3 and 6 in particular, appropriate side walls 20 which thus include and bound the chamber formed between the top 12 and the bottom wall 18.

Disposed intermediate the top and bottom walls is an inclined platform, partition or shelf 22 which extends from underneath the top wall exteriorly thereof and out to one end of the cabinet this partition being inclined and having a plurality of divider strips 24 thereon which thus provide and define a series of separated chutes or slides each designated by the numeral 30. As set forth hereinafter, each of these chutes is disposed to receive eggs having a particular weight, as the eggs are discharged thereon from the automatic weight sorting mechanisms of this apparatus, so that the eggs will then descend by gravity to the lower end of these chutes and be retained against a rim 32 for subsequent removal in any desired manner.

A turntable 40 which is preferably in the form of a circular plate or disk and which is preferably of a flexible or resilient material such as a suitable plastic is disposed immediately beneath the top wall 12 with the periphery of the turntable underlying the top wall radially outwardly from the opening 14 as will be apparent from FIGURE 1. The turntable, as shown in FIGURE 2 is fixedly secured to a stationary vertical spindle 42 whose lower end is supported in a suitable bracket 44 carried by the bottom wall 18 in order that the turntable may rotate about the vertical axis of the spindle. As set forth hereinafter, the turntable carries a plurality of mechanisms including weight sorting scales or pans.

Rotation is imparted to the turntable in the following manner. Any suitable source of power such as the electric motor 46, see FIGURE 3, is secured to one of the side walls 20 of the housing and has its driving shaft 48 provided with a pulley 50 which through a belt 52 drives the larger diameter pulley 54. The latter is also secured to a small driving pulley 56 carried by a common stub axle 58 and through a belt 60 operates the larger diameter driven pulley 62. The latter is carried by a stub axle 64 having a driving roller 66 thereon which driving roller is adapted to engage the undersurface of the turntable and constitute a friction drive for imparting rotation thereto. Thus a reduction gearing assembly is disposed between the electric motor and the turntable for imparting a relatively slow but continuous rotation to the latter. In addition to the driving roller 66, the turntable is rotatably supported by any desired number of idler rollers such as those shown at 70.

Preferably, as above mentioned, the turntable is of a flexible material so that it will sufficiently bend or deflect under its own weight and under the weight of the mechanism carried thereby to cause the turntable at all times to be securely supported upon the idler or driving rollers. When it is desired to increase the pressure of the turntable upon the driving roller, or the other rollers, this may be effected by merely raising or lowering the turntable mounting upon the spindle 42 by proper adjustment of the adjusting nuts 72, shown in FIGURE 2.

As shown particularly in FIGURE 1 there is provided a longitudinally slotted or divided inclined track 74 comprising a means for feeding eggs successively into the machine and also constituting a candling tray. Adjacent the bottom or lower end of this candling tray and disposed therebeneath is a suitable light source, not shown, by means of which the interior quality and shell texture of the eggs may be individually inspected prior to their discharge from the lower end of the candling tray. The latter may conveniently comprise a V-shaped trough so that eggs when manually placed thereon will descend by gravity down the inclined tray and will be retained at the lower end thereof and above the candling light until they are intermittently successively released in a manner to be subsequently set forth.

The turntable 40 adjacent its periphery is provided with a circumferentially spaced series of egg receiving discharge openings 76. Any desired number of these openings may be provided and successive openings will successively receive and pass eggs through the turntable during rotation of the latter, delivering the eggs to a weighing mechanism and for subsequent discharge to the delivery tray or platform 22. Only one of the openings 76 is exposed in FIGURE 1 since it will be understood that other of the series of openings 76 will lie under the top surface 12 during rotation of the turntable.

A plurality of weight sorting devices, attention being now directed to FIGURES 2 and 7, each designated generally by the numeral 80, are secured to the underside of the turntable and rotate therewith, the function of these devices being that each receives an egg passing through the opening 76 in the turntable and then depending upon the weight of the egg, positions the latter at a particular vertical elevation within the housing and above the inward extremity of the delivery platform 22. Use is made of this variation of the vertical positioning of the eggs in accordance with their weight to selectively discharge the eggs of the same weight range to a particular one of the chutes or troughs 30 so that the eggs will thus be sorted according to their weight.

There is provided a weight sorting mechanism 80 for each of the egg dispensing openings 76. For this purpose a bracket assembly 82 is provided for each of the weight sorting means 80 which bracket assembly 82 is secured to the underside of the turntable 40 in fixedly mounted position thereon for rotation therewith. As shown in FIGURE 7, the bracket assembly 82 includes a spacer bushing or sleeve 84 which together with the horizontal bracket member 86 is secured to the underside of the turntable by means of a fastening bolt 88. The position of the fastening bolts for the series of weight sorting means 80 will be best apparent from FIGURE 1.

Depending from the end of the bracket 86 is a vertical bracket leg 90. Secured to the leg 90 by a parallelogram linkage is a horizontally disposed flat pan or tray 92 having a dished recess 94 therein provided with an opening 96 of sufficient size to receive the side portion of an egg as shown in dotted lines at 98 in FIGURE 7. Depending from and supporting one end of the pan 92 is a vertical supporting bracket 100 to which the parallelogram linkage is attached. The parallelogram linkage consists of a lower short link 102 and an upper long link and lever 104 which are pivoted to the two legs 100 and 90 as shown in FIGURE 7. The lever 104 has opposite arms 107 and 108 and is provided with a weight 106 thereon and is pivoted at 109 to the bracket 90.

The parallel linkage is so disposed, as set forth hereinafter, that with a given weight 106, an egg deposited in the pan 92 will pivot the linkage and cause the pan to be positioned at an elevation which is proportional to the weight of the egg. In other words, eggs of different weight will with their pans lie in different vertical altitudes during the rotation of the turntable about its spindle. The pans are so disposed that they will overlie the upper end of the grading and sorting delivery platform 22 so that when the eggs are discharged from the pans or trays, of the weight sorting mechanism upon the platform 22 at an appropriate chute 30, they will descend by gravity therealong so that eggs of a given weight category will be collected together.

When the egg receiving pans 92 are empty, the weights 106 will normally return and hold these pans in their elevated position in closely spaced relation below the turntable as indicated best in FIGURE 2. However, as soon as an egg is deposited in the pan by passing through one of the openings 76 in the turntable, the pan and the egg will be gravity urged downwardly into a position which corresponds to that particular weight of egg.

Consequently, the pans either in their elevated position when unloaded or at varying altitudes when loaded will rotate with the turntable.

Referring now more closely to FIGURE 7 it will be seen that the right hand or the weighted end of the lever arms 107 and 108 are slightly angulated and form an angle of about 15 degrees with each other. The proportionate lengths of the lever arms 107, 108 and the weight 106 are so chosen so as to prevent a large heavy egg from moving the egg pan 92 to the bottom of the range of travel of the linkage. The above mentioned angular relation of the arms 107 and 108 contributes to this and this construction is found to produce an extremely sensitive action in the weight sorting device.

As previously mentioned, the lower end of the candling tray 74 terminates just above the top surface 12 of the cabinet. Means are provided for retaining the eggs upon the tray until they are automatically released in timed relation together with means rotating with the turntable for partially encircling the eggs and moving them therewith. The egg engaging and retaining means consists of a plurality of C-shaped rings 110, one for each opening 76, which as shown in FIGURE 1 are fixedly secured as by fasteners 112 to horizontally extending arms 114 which in turn are secured to standards or posts 116 rising from the upper surface of the turntable. The rings themselves closely overlie and slide upon the top surface 12 and during the rotation of the turntable will pass below the discharge end of the candling tray 74. The arrangement is such that when an egg is released from the candling tray by a timed releasing means to be subsequently described, it will be received within the particular C-shaped ring 110 then disposed at the end of the candling tray and will be moved by this ring across the top surface 12 until the side edge 16 of the top surface is reached, at which time the egg is free to descend from the top surface through the turntable. Each of the rings is disposed concentrically of and above a discharge opening 76 in the turntable so that when the egg received within the ring passes off of the top surface, it is then free to pass by gravity downwardly through the opening 76 and into the associated weighing pan 92 disposed thereneath. At that time the operation is such that the weighted pan will now descend to an elevation dependent upon the weight of that particular egg. The rings 110 remain and continuously rotate above the top surface 12 as previously set forth.

The egg releasing means as shown in FIGURES 1, 2 and 9, consist of a generally U-shaped lever member consisting of a straight arm 118 adapted to be disposed along one side of the candling tray 74 which at one extremity is provided with a transversely disposed stop bar 120 normally positioned across the discharge end of the candling tray to thus bar exit of the eggs therefrom. The other end of the arm 118 is provided with a transversely disposed pivot arm 122 which as shown in FIGURE 9 is journaled in suitable bearing members 124 secured to the underside of the candling tray. The pivot arm 122 underlies the candling tray and in turn terminates in a perpendicular actuating arm 126 which is disposed in the path of travel of the rings 110 as the latter pass beneath the candling tray. At its extremity, the actuating arm 126 has an upturned finger 127, see FIGURE 9, which is insertable up through the tray 74 between the first two eggs thereon. The arrangement is such that as the ring moves forward under the tray 74, it will engage the actuating arm 126 and lift the latter thereby pivoting the stop arm 120 upwardly to move the finger 127 up through the tray into position to block movement of the second egg from the tray while the stop bar 120 is lifted to release the endmost egg where the latter descends by gravity off of the tray and onto the top surface 12 from which it passes into the C-shaped ring, is embraced by the latter and is carried forward by the rotation of the ring with the turntable. There is also provided a further stop means in the form of a bracket 130 secured to the top surface 12 at one side of the candling tray and from which bracket extends an upwardly inclined bracket support arm 132 having a flexible depending arm 134 thereon. The arm 134 lies above the space through which an egg will move in the passage from the tray 74 to the side edge 16 during the operation of the device and is in the path of travel of the egg and will prevent its escape once it has been released by the stop bar 120. The C-shaped ring will pass beneath the stop member 134.

This portion of the apparatus operates as follows:

With the candling rack loaded with eggs, as shown in FIGURE 2 and FIGURE 9, the eggs may be visually examined as they pass over the candling bulb, not shown, and the row of eggs will be retained by the stop bar 120. During the rotation of the turntable the next ring which is to receive an egg when moving forward will have its opening pass about the actuating lever 126 without operating the same so that the ring will then be disposed at the end of the candling tray as the closed portion of the ring strikes and actuates the actuating lever 126 to lift the latter. This raises the finger 127 to block and retain the second egg on the tray 74 while lifting the stop bar 120 allowing the first egg to escape. As the stop bar lifts, the egg released thereby will descend and engage against the stop means 134, as shown in FIGURE 9 at which time the egg will then become seated in the ring 110. Further movement of the turntable and ring will carry the egg with it and pass beneath and flex the stop means 134 and then slide upon the top surface 12 until the egg passes from the top surface and drops through the opening 76 into the weighing means previously described.

Means are also provided for discharging the eggs positively from the weight sorting mechanisms 80 when the eggs reach the discharge stations of the platform 22. For an understanding of this discharging means, attention is now invited to FIGURES 2-8.

The egg discharging means include a series of pan lowering means or pan depressers each appropriately vertically positioned and associated with and disposed with one of the discharge chutes 30 of the sorting platform together with an egg displacing finger associated therewith. The pan depressers include vertical depending support rods 140 each secured to and depending from the front support of the cabinet and each disposed over one of the chutes. Secured to and extending transversely of each of these support rods 140 is a horizontally extending rod 142. The latter, as shown in FIGURE 7 is in closely overlying relation to both the platform 22 and the egg pans 92. Secured to the radially inward ends of the radially disposed horizontally extending rods 142 is a crescent shaped cam 144. Each of these cams, as shown in FIGURE 4, has a convex lower surface with a gradually curving cam contour 146. As will be observed from FIGURE 8 the approach or forward ends of these cam surfaces 146 of consecutive depresser members 144 are disposed at progressively higher vertical elevations. The purpose of this construction is to enable each of the individual pans 92, regardless of its elevation as determined by the weight of the egg carried thereby, to engage during its rotation with an appropriately positioned one of the depressers 144. When the weighing pan engages under the depresser, the convex cam surface 146 will cause the pan to lower into very close proximity to the platform 22 and below the rod 142. As the pan moves beneath this rod, as suggested in FIGURE 7, the egg carried by the pan will be brushed gently from the pan onto the closely adjacent underlying platform and will move by gravity down the associated chute 30.

As will now be appreciated, the heaviest egg will now be dislodged by the first or lowest depresser member 144 at the left of FIGURE 4 and the associated rod 142.

The egg pan of the lighter eggs will be vertically positioned too high to engage the first depresser cam 144 and will pass thereabove. The next heaviest egg pan will pass over the first member 144 but will be engaged by, and pass under the second member 144 and so on. The lightest egg will of course engage the last or most highly positioned of the members 144 which will in turn bring the pan down to the platform while the rod 142 will wipe the egg therefrom. The highest positioned of the cam members 144 at the right hand side of FIGURE 4 has a guide member 145 acting as a trailing edge therefor, whose inclination and contour is such as to allow a gradual lifting of the now empty pans 92 to their normal raised position, thereby avoiding abrupt or bumpy movements of the weight sorting mechanism as the latter return to the egg receiving position. Associated with each of the members 144 is a flexible trailing member 147 which holds the egg pan depressed after the egg has been discharged therefrom. The member 147 overlaps the edges of the next adjacent member 144 preventing the pans 94 from rising until they reach and pass the guide member 145 at the last of the members 144.

Disposed substantially opposite the series of the depresser members 144 is a supporting rod 150 together with guide members 151 and 152 which are so positioned that they will be engaged by the undersides of trays 92 after the latter are loaded and as the latter revolve with the turntable. The member 151 is horizontally extending and supports the egg pan 94 when the latter is loaded. The inclined member 152 allows the loaded pan to gradually lower to its vertical position as determined by the weight of the egg, avoiding bouncing or abrupt movement.

In order to facilitate the cooperative action between the weighting pans 92 and the depresser members 144, the forward edge of the weighting pans may be beveled as shown at 154 in FIGURE 8 to facilitate such action.

The complete method of operation in accordance with this form of the invention is as follows:

Eggs are placed on the candling tray 74 either manually or otherwise, the supply of eggs being maintained or replenished as the turntable rotates. As each of the rings 110 passes underneath the discharge end of the candling tray, and above the top wall 12, it will actuate the release mechanism to permit an egg to move from the candling tray into the ring 110, the passage of more than one such egg being prevented by the action of the finger 127 of the actuating arm 126 so designed as to permit the passage of only one egg at a time. The continuing movement of the turntable and of the ring moves the egg across the top of the top wall 12 so that it reaches the edge 16 thereof, at which time the egg is now free to slide through the ring and into the dispensing opening 76 in the turntable and into the associated egg tray 94 disposed therebeneath. At once the weight sorting mechanism operates and the pan after moving across and down the members 151, 152 assumes a vertical position of altitude which is proportionate to the weight of the egg. The previously mentioned cam members 151, 152 support the underside of the egg tray and effect a gradual lowering of the latter under the weight of the egg during the rotation of the turntable and of the weight sorting mechanism, thereby preventing oscillation or bounce of the egg pans. The egg pans convey the egg around the machine until they reach the trip members which through operation of the depresser members 144 lower the egg pans to the top of the platform 22, and through the members 142 then gently brush the eggs from the pans.

It will be noted that the turntable is a complete subassembly containing the plurality of openings 76 each of which has an associated weight sorting mechanism 80 and egg handling ring 110.

The capacity of the machine is easily varied, or replacement of a damaged part is quickly effected by merely replacing one turntable and its associated mechanism with another which latter may have a different number of openings and mechanisms.

*Modified Construction of FIGURES 10–12*

In FIGURES 10–12 is shown a modified construction of the apparatus operating upon the same general principles. Insofar as the same elements are employed in this form of the invention as were utilized as components in the embodiment of FIGURES 1–9, the same reference numerals have been applied thereto. Thus the support or cabinet 10 likewise has at one end thereof an outwardly and downwardly inclined egg supporting and sorting platform 22 provided with a rim 32 and likewise divided as by rails 24 and a plurality of chutes 30. However, a different construction of drive mechanism is shown indicated generally by the numeral 160 to impart rotation to the turntable. The latter is indicated by the numeral 162 and is rotatably supported below the top wall 12 and above a partition 164 upon which the innermost extremity of the separating and sorting platform 22 is supported. The turntable likewise is provided with the weight sorting mechanisms 80 as previously described and each of which is associated with one of the egg discharge openings 76 in the turntable. Similarly, pan depressing means indicated generally by the numeral 166 is associated with each of the chutes 30 in order to depress the pan of the weight sorting mechanisms 80 so that the egg carried thereby may be discharged from the pan into the appropriate chute in the same manner previously described.

In this form of the invention, there is indicated by the numeral 168 a light source beneath a light opening 170 which in this instance is disposed preferably at the upper end of the candling tray 172 which candling tray is otherwise mounted in the same manner as that in the preceding embodiment.

However, at the lower end of the candling tray the top wall is provided with an opening 174 therethrough and a cleaning brush 176 is rotatably received in this opening as shown. Disposed beneath this opening are guide bars or retainers 178 so that an egg passing thereinto will be engaged by the rotating brush 176 and dry cleaned. The egg as it passes into the recess is resting upon the top surface of the turntable until the next opening 76 passes therebeneath, at which time the egg will drop into the weighing pan through this opening and be graded and sorted as previously described.

In this form of the invention a modified form of egg releasing means is provided. As shown in FIGURES 11 and 12 this egg releasing means consists of an egg ejecting pin 180 journaled in the top wall and projectible up through the candling tray 172. The turntable 162 carries a cam 182 upon its top surface which is positioned to periodically lift ejecting pin 180 and thereby discharge an egg received in the egg tray.

This form of the invention possesses the novel features that the candling means is at the upper end of the candling tray, there is provided an automatic release mechanism which is cam operated by the turntable for discharging the endmost egg in the candling tray, and a brushing station and a rotary brush is provided for cleaning the eggs prior to their delivery to the weight sorting mechanism.

The foregoing is considered as illustrative only of the principles of the invention. Further, since numerous modifications and changes will readily occur to those skilled in art, it is not desired to limit the invention to the exact construction and operation shown and described, and accordingly all suitable modifications and equivalents may be resorted to, falling within the scope of the invention as claimed.

What is claimed as new is as follows:

1. An egg sorting machine including a support, a horizontal turntable mounted upon said support for rotation about a vertical axis, a plurality of circumferentially spaced egg discharge openings in said turntable, a plurality of weight sorting means each secured to said turntable for rotation therewith and each disposed beneath one of said openings for receiving an egg passing therethrough, means for discharging eggs from said weight sorting means, an egg collecting means mounted on said support and disposed below said weight sorting means for receiving from the latter eggs of a uniform weight.

2. An egg sorting machine including a support, a horizontal turntable rotatably mounted upon said support, a plurality of circumferentially spaced egg discharge openings in said turntable, a plurality of weight sorting means each secured to said turntable for rotation therewith and each disposed beneath one of said openings for receiving an egg passing therethrough, means for discharging eggs from said weight sorting means, an egg collecting means mounted on said support and disposed below said weight sorting means for receiving from the latter eggs of a uniform weight, means for feeding eggs in sequence to said turntable openings and said weight sorting means.

3. The combination of claim 2 wherein said egg feeding means includes an egg delivery tray, stop means preventing discharge of eggs from said tray, a limit means limiting discharge of eggs from said tray to a single egg upon release of said stop means, actuating means for effecting timed release of said stop means.

4. The combination of claim 3 wherein said egg feeding means includes a plurality of egg retaining rings carried by the top of said turntable, each ring being disposed in alignment with and above a turntable opening, a wall interposed between said turntable and said rings, said stop means discharging eggs upon said wall and within said rings, said wall having an opening through which eggs retained by said rings may discharge through said turntable openings into said weight sorting means.

5. The combination of claim 1 including depresser means for lowering said weight sorting means into discharge position above said egg collecting means.

6. The combination of claim 5 including means for wiping eggs from said weight sorting means into said egg collecting means.

7. The combination of claim 6 including retarding means for gently lowering said weight sorting means into a weighed position.

8. The combination of claim 1 wherein said turntable is of a pliable and flexible material, support and driving rollers journaled upon said support and upon which said turntable is supported.

9. The combination of claim 2 wherein each of said weight sorting means includes an egg pan, a parallelogram linkage connecting said pan to said turntable for vertical movement of said pan, a counterweight connected to said linkage.

10. The combination of claim 9 wherein said linkage includes as one of its links a lever having angulated oppositely extending arms, said counterweight being secured to one of said arms.

11. The combination of claim 10 wherein said lever arms are at an angle of about 15°.

12. An egg weight sorting machine comprising a horizontal turntable, means mounting said turntable for rotation about a vertical axis, said turntable having a plurality of circumferentially spaced openings therethrough, a plurality of weight sorting means mounted upon the underside of said turntable and each disposed beneath one of said openings for receiving an egg passing through the latter, a plurality of egg collection means, each receiving eggs of a uniform weight, discharge means cooperating with said weight sorting means for selectively discharging eggs from the latter to an egg collection means corresponding to a particular weight of egg, means for feeding eggs singly to successive openings of said turntable.

13. The combination of claim 12 including a stationary top wall overlying the peripheral portion and the openings of a major circumferential extent of said turntable but successively uncovering at least one opening thereof, said feeding means including retaining rings mounted on said turntable above, and each in registration with, an opening, and an egg releasing means disposed above said top wall, said rings being slidable upon said top wall and beneath said release means for moving an egg from the latter across said top wall and to the associated opening when uncovered by said top wall.

14. A machine for sorting eggs into different weight grades comprising an egg supply means and a plurality of egg receiving means spaced from said supply means, carrier means for continuously conveying eggs from said supply means to said receiving means, said carrier means including a plurality of egg receiving and weight sorting means, each including a pan and a mounting means, said mounting means movably supporting said pans in variable vertical altitudes, each corresponding to a different weight of egg, egg discharge means at said receiving means and responsive to the vertical altitudes of said pans for discharging therefrom eggs to a receiving means corresponding to that weight of egg.

15. The combination of claim 14 wherein said receiving means are disposed below said pans and said discharge means, a series of separate depressor means, each responsive to a particular vertical altitude of the pans for depressing all of said pans disposed at that altitude down to an associated receiving means, an unloading means for each depressor means to dislodge the egg from the pan lowered by said last mentioned depressor means to said associated receiving means.

16. The combination of claim 15 including retarding means adjacent said egg supply means engaging and supporting a pan during its loading from said supply means and gently lowering said pan to its vertical altitude corresponding to the weight of the egg received by said pan.

17. The combination of claim 16 wherein said depressor means comprises a series of cam elements having overlapping lower cam surfaces each positioned to overlie and engage the pans at a predetermined vertical altitude.

18. The combination of claim 14 wherein said receiving means are disposed below said pans and said discharge means, a series of separate depressor means, each responsive to a particular vertical altitude of the pans for depressing all of said pans disposed at that altitude down to an associated receiving means, and unloading means for each depressor means to dislodge the egg from the pan, lowered by said last mentioned depressor means, to said associated receiving means, said depressor means comprising a series of cam elements having overlapping lower cam surfaces each positioned to overlie and engage the pans at a predetermined vertical altitude.

19. The combination of claim 18 wherein said cam elements have their cam surfaces disposed at successively higher altitudes in the direction of travel of said pans.

20. The combination of claim 14 wherein said carrier means comprises a flexible flat member, means including support and drive rollers upon which said carrier means rests.

21. The combination of claim 12 including a stationary top wall overlying the peripheral portion and the openings of a major circumferential extent of said turntable but successively uncovering at least one opening thereof, said feeding means including retaining rings mounted on said turntable above, and each in registration with, an opening, and an egg releasing means disposed above said top wall, said ring being slidable upon said top wall and beneath said release means for moving an egg from the latter across said top wall and to the associated opening when uncovered by said top wall, said releasing means including an actuator disposed in the path of movement of said rings for actuation thereby, each ring having an opening on its forward portion for passage of said actuator therethrough whereby the rear portion only of the ring will engage and operate said actuator.

(References on following page)

References Cited in the file of this patent

UNITED STATES PATENTS

| | | |
|---|---|---|
| 956,426 | Rowland et al. | Apr. 26, 1910 |
| 1,730,157 | McDonald | Oct. 1, 1929 |
| 1,875,811 | Hilgers | Sept. 6, 1932 |
| 1,907,074 | Lenschow | May 2, 1933 |
| 2,096,228 | Dudgeon | Oct. 19, 1937 |
| 2,139,574 | Butterfield | Dec. 6, 1938 |
| 2,436,534 | Tolley | Feb. 24, 1948 |
| 2,442,475 | Swanson | June 1, 1948 |
| 2,635,267 | Smith | Apr. 21, 1953 |
| 2,833,408 | Norris et al. | May 6, 1958 |